Figure 1:
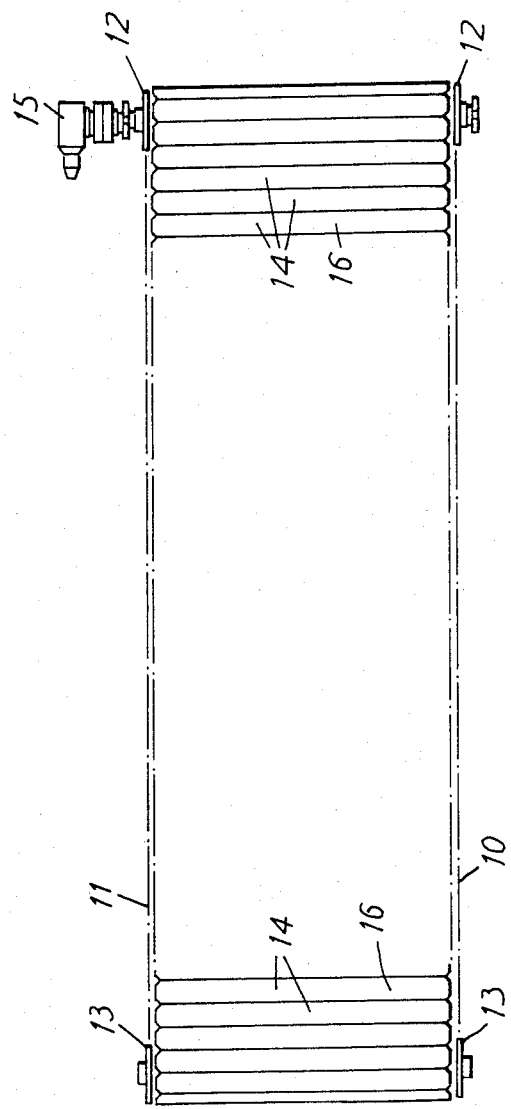

United States Patent [19]

Finnighan

[11] Patent Number: 4,526,271

[45] Date of Patent: Jul. 2, 1985

[54] SLAT CONVEYOR

[75] Inventor: Francis M. Finnighan, Peterborough, Canada

[73] Assignee: Alfa-Laval Cheese Systems Limited, Somerset, England

[21] Appl. No.: 392,692

[22] Filed: Jun. 28, 1982

[30] Foreign Application Priority Data

Jul. 1, 1981 [GB] United Kingdom ................. 8120355

[51] Int. Cl.$^3$ ............................................. B65G 47/84
[52] U.S. Cl. .................................. 198/648; 198/845; 198/851
[58] Field of Search .............. 198/648, 712, 730, 731, 198/851, 853, 845, 838, 495, 500

[56] References Cited

U.S. PATENT DOCUMENTS 2,035,018  3/1936  Smith .................................. 198/730
3,441,123  4/1969  Griffith ............................... 198/845

FOREIGN PATENT DOCUMENTS 378247    8/1932  United Kingdom ................. 198/845
2103303   2/1983  United Kingdom ................. 198/495

Primary Examiner—Joseph E. Valenza
Attorney, Agent, or Firm—Davis Hoxie Faithfull & Hapgood

[57] ABSTRACT

A slat conveyor which can be assembled and dismantled from the sides thereof without the need to provide access from above or below, comprises a pair of endless side chains mounted on guide rails and a plurality of slats mounted on and extending between the side chains. The side chains comprise links pivotally connected to one another by transverse spindles. Each slat is connected at one end to a link of one side chain fitted with two spindles, and at the other end to a link of the other side chain formed with two bearing apertures for reception of spindles. Alternate slats are reversed end to end with the spindles on each slat engaged in the bearing apertures on the adjacent slats, so that the slats can be withdrawn from the sides.

10 Claims, 8 Drawing Figures

SLAT CONVEYOR

This invention relates to slat conveyors, and is concerned more particularly but no exclusively to slat conveyors suitable for handling cheese curd in mechanised installations.

The object of the invention is to provide an improved construction of slat conveyor which can readily be assembled and dismantled for cleaning purposes.

According to the invention there is provided a slat conveyor comprising a pair of endless chains mounted on guide means for movement along parallel tracks, and a plurality of transverse slats mounted on and extending between the chains, each chain comprising links pivotally connected to one another by transverse spindles, wherein one end of each slat is attached to at least one of the transverse spindles of the associated chain, the adjacent link or links of the associated chain being arranged outboard of said one end of the slat and formed with a bearing aperture which receives the transverse spindle, and the other end of each slat is formed with at least one bearing aperture which receives a transverse spindle attached to an adjacent link of the associated chain, said link attached to the transverse spindle being arranged inboard of the bearing aperture in said other end of the slat, whereby the slat can be disengaged from the remainder of the chains by withdrawing the slat axially in a direction away from said one end thereof so as to slide the spindle attached to said one end of the slat out of the bearing aperture in the adjacent link or links and slide the other end of the slat off the spindle attached to the adjacent link.

A slat conveyor in accordance with the invention may be so constructed that it can be assembled and dismantled from the sides thereof without the need to provide access from above or below. The conveyor is thus particularly suitable for use in mechanical handling installations in which the conveyors are superimposed one above another, such as for example in the cheese making installation described and illustrated in U.S. Pat. No. 4,309,941.

In a preferred construction of the slat conveyor of the invention, each slat is secured at each end to a link of the associated chain, the link at one end of each slat being fitted with two transverse spindles of the associated chain, the adjacent links of the associated chain being arranged outboard of the link and being formed with bearing apertures in which the spindles are engaged, and the link at the other end of the slat being provided with two bearing apertures, adjacent links of the associated chain being arranged inboard of the last mentioned link and having transverse spindles engaged in the bearing apertures in the link. The spindles on the link attached to each slat at one end thereof may then be pivotally mounted in the bearing apertures in the links attached to the adjacent slats. With this construction the slat assemblies, that is the slats fitted with links at each end, can be of identical construction and arranged in an assembled conveyor with each slat assembly reversed end to end with respect to the adjacent slat assemblies.

Each chain preferably comprises pairs of outer links pivotally connected to pairs of inner links by the transverse spindles, the spindles being secured to the inboard outer links and each slat having one end attached to an inboard outer link and the other end attached to an inboard inner link. Each of the inboard links may be provided with a slat support bracket in the form of a plate one edge of which is welded to the side of the link facing the slat with the plate extending perpendicular to the side of the link. Alternatively, each inboard link and its bracket may be integral and formed from a metal plate, one end of the plate being shaped to form the link, the other end of the plate being shaped to form the bracket, and the centre portion of the plate being folded so that the bracket extends substantially perpendicularly relative to the adjacent side of the link.

The chains may be supported on guide rails by rollers rotatably mounted one on each spindle between the inner links of each chain. Each roller preferably comprises an annular body, the central opening of which is fitted with a cylindrical bush of low friction material such as for example RULON which does not require lubrication. The ends of the bush may project outwards beyond the sides of the roller body and abut against the inner links so as thereby to avoid frictional contact between the roller body and the links. To facilitate cleaning, each spindle may be formed with an axial bore closed at the inboard end thereof and further bores connecting the axial bore to the annular space between the bearing surfaces of the bush and the spindle, whereby cleaning liquid forced into the axial bore will flow into the above mentioned annular space and across the bearing surfaces.

Figure 2:
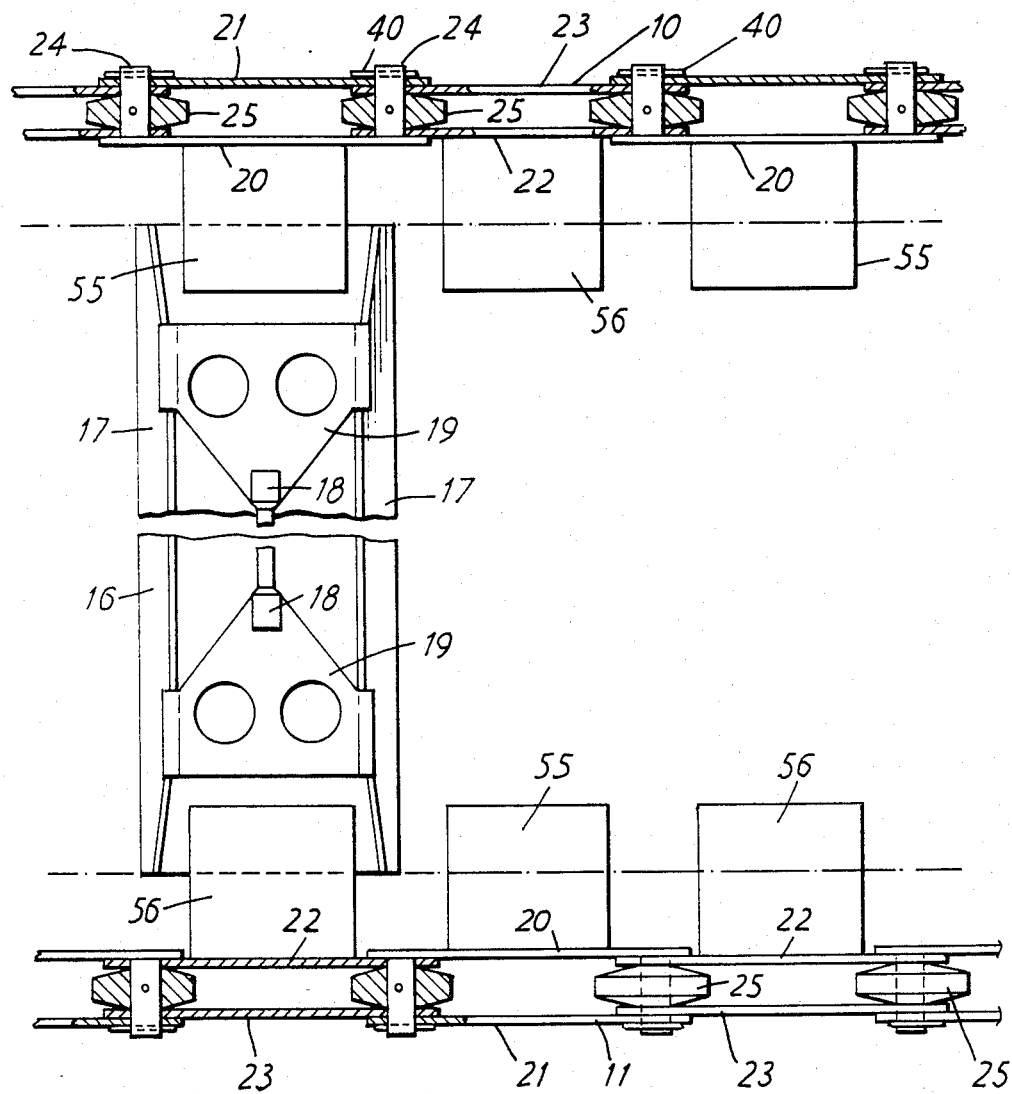
Figure 3:
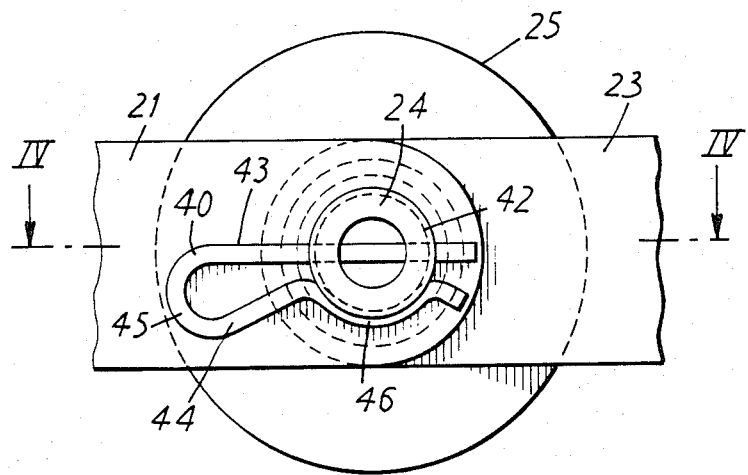
Figure 4:
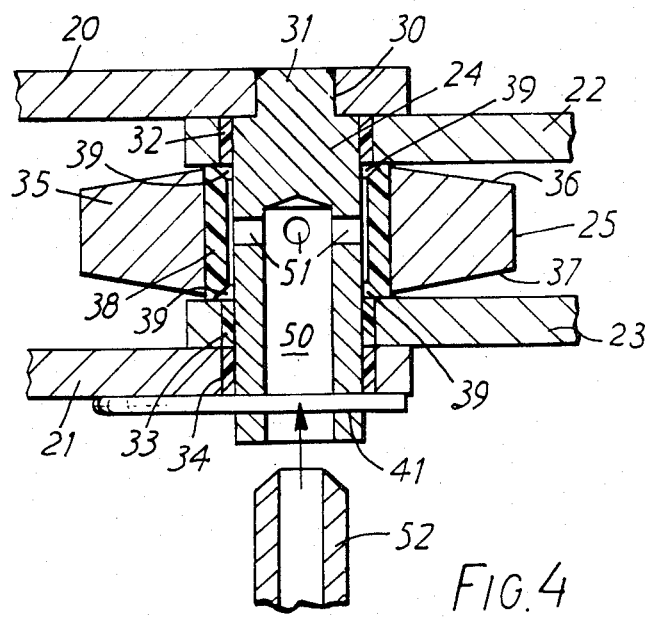
Figure 5:
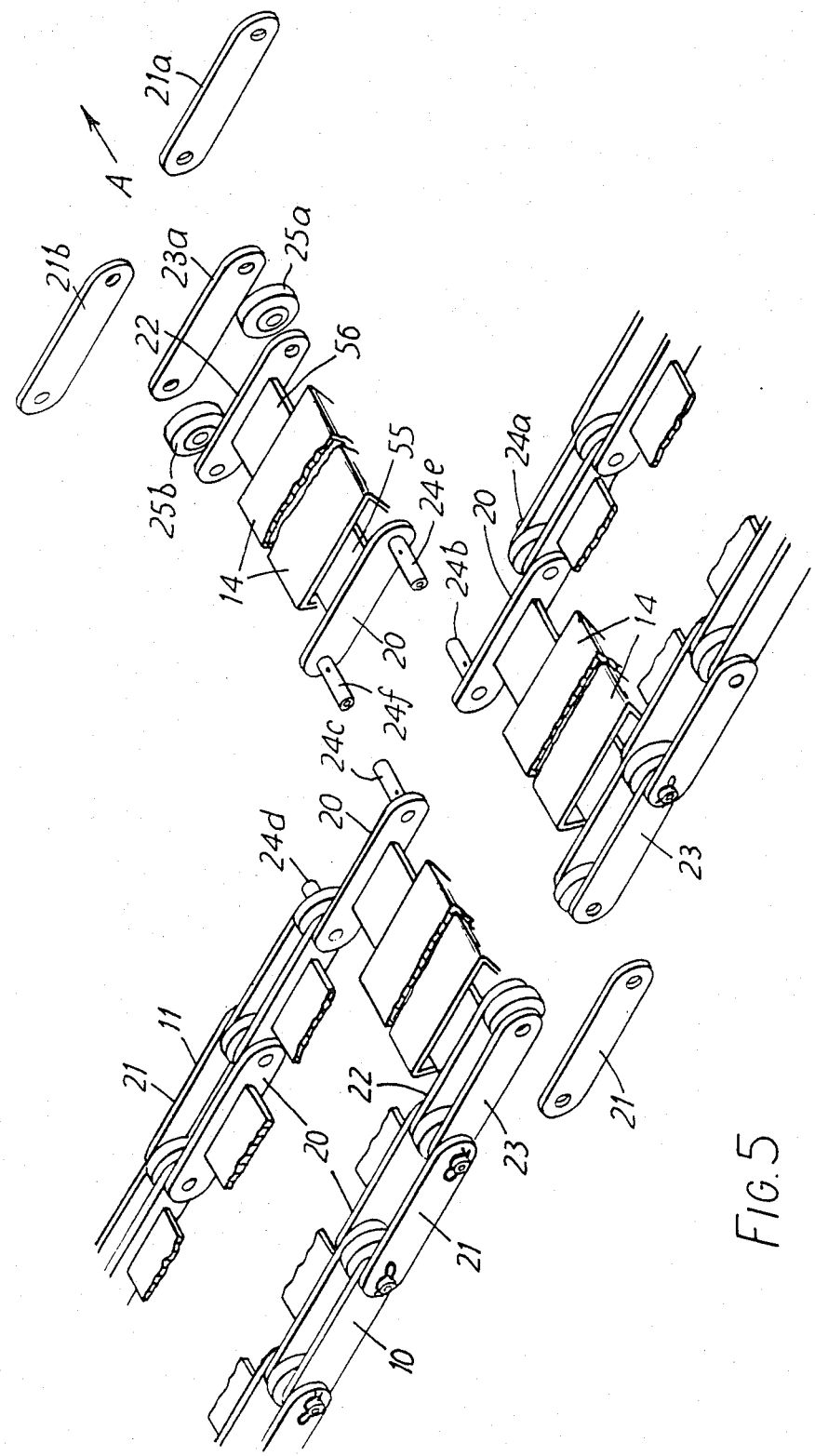
Figure 6:
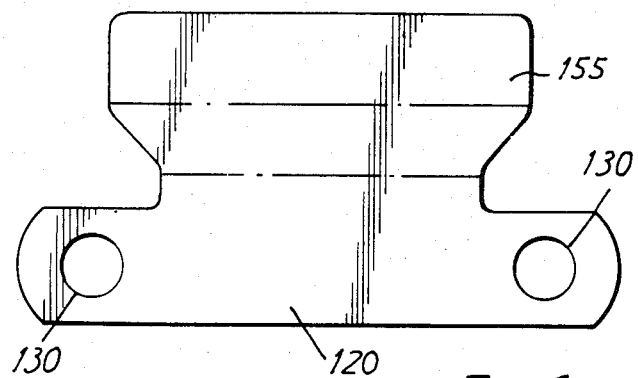
Figure 7:
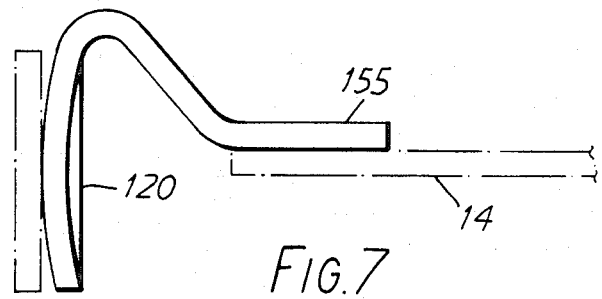
Figure 8:
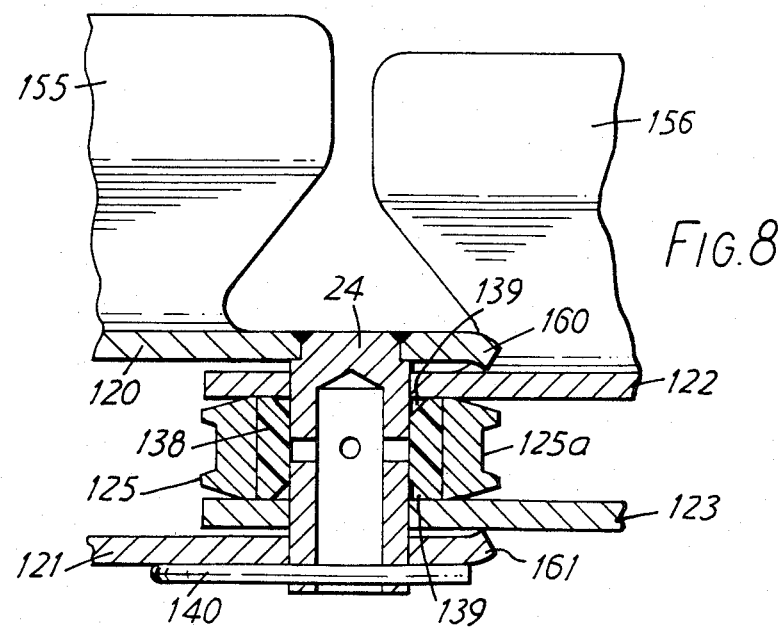

Embodiments of the invention will now be described, by way of example, with reference to the accompanying drawings, in which:

FIG. 1 is a plan view of a slat conveyor according to the invention,

FIG. 2 is a view of the underside of the chains and one slat of the conveyor, the centre portion of the slat being cut away, FIG. 3 is a side view on an enlarged scale of part of one of the side chains, FIG. 4 is a cross sectional view taken along the line IV—IV in FIG. 3, and including a nozzle for supplying cleaning liquid, FIG. 5 is a perspective view with the slats cut away, the two side chains being shown closer together for convenience, and part of the side chains being shown in exploded view, FIG. 6 is a plan view of a metal plate for making an integral link and bracket for use in a modified construction of side chain, FIG. 7 is an end view of the metal plate of FIG. 6, on a larger scale, after the plate has been shaped into the integral link and bracket, and FIG. 8 is a cross-sectional view of part of the modified construction of side chain.

Referring to FIG. 1, the conveyor comprises two endless side chains 10, 11 each mounted on two sprockets 12, 13 secured on transverse shafts rotatably mounted in a frame (not shown), and a plurality of transverse slats 14 mounted on and extending between the chains. The upper and lower runs of the chains are supported on guide rails (not shown) secured on the frame of the conveyor, and an electric motor 15 is arranged to drive the sprockets 12 and thereby pull the chains along the rails. The slats 14 may be of any suitable construction, but can conveniently be in the form shown in U.S. Pat. No. 4,326,626 and, as shown in FIG. 2, comprise a thin elongated metal plate 16 having the longitudinal margins 17 bent through an angle in excess of 90°, and longitudinal strengthening means in the form of a V-shaped bar 18 having the ends thereof secured to plates 19 welded to the bent-over margins 17 of the plate 16, the centre portion of the plate being supported by a strut (not shown) on the centre of the bar 18. Conveyors having slats of this construction can provide a substantially flat upper surface but nevertheless be several meters wide and support a heavy load per unit area without the aid of additional supports between the chains.

Each of the side chains 10, 11 comprises pairs of outer links 20, 21 pivotally connected to pairs of inner links 22, 23 by transverse spindles 24, and rollers 25 rotatably mounted on each spindle 24 between the inner links 22, 23. All the links are of the same length with the links of each pair parallel to one another. The links 20 are on the inboard side of the chain, that is the side adjacent the slats, and each link 20 is fitted with two of the spindles 24 located in apertures 30 (FIG. 4) arranged one adjacent each end of the link 20. Each spindle has a reduced diameter end 31 located in the aperture 30 and welded thereto, the spindles being arranged so that they project perpendicularly outwards from the link 20. The links 22 are each fitted with two cylindrical bushes 32 located in apertures arranged one adjacent each end of the link, the links 23 are similarly each fitted with two cylindrical bushes 33 arranged one adjacent each end of the link, and the links 21 are each fitted with two cylindrical bushes 34 located in apertures arranged one adjacent each end of the link. Each roller 25 comprises an annular body 35 having bevelled side walls 36, 37 and a cylindrical bush 38 secured in the central opening in the roller body. The ends of the bush 38 project outwards beyond the side walls 36, 37 and are each formed with an annular recess 39 on the inner surface of the bush. Each spindle 24 extends as a close rotational fit through the bushses in the associated link 22, roller 25 and links 23, 21, the links and roller being held in position on the spindle by a hitch pin 40.

Each hitch pin 40 is secured in a transverse bore 41 in the outer end of the associated spindle 24. As shown in FIG. 3, the outer end of the spindle is formed with an annular groove 42 on its outer surface, the bore 41 opening into the groove, and each hitch pin 40 has two limbs 43, 44 connected by a bight portion 45, the limb 43 being straight and the limb 44 having a curved portion 46 adapted to engage as a snap fit in the groove 42 when the limb 43 is inserted in the bore 41. The bight portion 45 forms a handle which facilitates withdrawal of the pin to permit removal of the links 21, 22, 23 and the roller 25 from the spindle when it is necessary to dismantle the chain.

Each hitch pin 40 can of course be replaced by a simple pin, a cotter pin, a spring retaining ring or other suitable device which can easily be detached from the spindle.

As shown in FIG. 4, each hitch pin 40 holds the associated link 21 in abutting contact with the link 23 which is in turn held in abutting contact with the adjacent projecting end of the bush 38 on the roller. The opposite end of the bush 38 on the roller is in abutting contact with the link 22 which is in turn in abutting contact with the link 20. The annular recesses 39 in the ends of the bush 38 on the roller thus co-operate with the spindle and the adjacent links to form annular chambers which open directly into the annular space between the spindle and the bush 38, and into the annular space between the spindle and the bush 32 or 33 in the adjacent link.

The spindles 24 are made of metal and the bushes are made of a low friction material, such as for example RULON, so that no lubrication is required between the spindle and the inner surfaces of the bushes forming cylindrical bearing surfaces on the links and roller. The ends of the bush 38 on the roller, which project beyond the body of the roller, also provide radial bearing surfaces in sliding contact with the adjacent links 22, 23.

Each spindle 24 is provided with an axial bore 50 and radial bores 51 which connect the axial bore 50 with the annular space between the spindle and the bush 38 on the roller. The bore 50 is closed at its inner end and opens through the outer end of the spindle to permit application of a nozzle 52 for supply of cleaning liquid to the bore 50.

Each of the links 20 is fitted with a slat support bracket 55 formed by a plate, one edge of the bracket 55 being welded to the side of the link facing the slat with the bracket extending inwardly perpendicular to the side of the link. Similarly each of the links 22 is fitted with a slat support bracket 56 formed by a plate, one edge of the bracket 56 being welded to the side of the link facing the slat with the bracket extending perpendicular to the side of the link. The brackets 55, 56 have been omitted from FIG. 4.

The side chains 10, 11 each have an equal number of links and are offset longitudinally relative to one another by the length of a link so that each slat support bracket 55 on a link 20 of each chain is directly opposite a slat support bracket 56 on a link 22 of the other chain. Each slat 14 is mounted on the side chains with one end of the metal plate 16 on the slat welded to the bracket 55 on a link 20 of one chain and the opposite end of the metal plate 16 welded to the bracket 56 on a link 22 of the other chain. Each slat assembly consisting of a slat and links 20, 22 is thus reversed with respect to the adjacent slat assemblies so that the bushes 32 on the link 22 of each slat assembly are mounted on the spindles attached to the links 20 on the adjacent slat assemblies.

The bearing surfaces between each spindle 24 and roller 25 in the side chains 10, 11 can be cleaned without dismantling the chains by supplying cleaning liquid under pressure to the nozzle 52 and applying the nozzle to the open end of the axial bore 50 in the spindle. The open ends of the axial bores 50 are on the outboard sides of the chains relative to the remainder of the conveyor and are thus readily accessible. Liquid forced into each axial bore 50 will flow through the bores 51 and into the annular space between the spindle and the bush 38. The liquid will flow across the bearing surfaces on the spindle and bush 38 and into the annular chambers formed by the recesses 39 at the ends of the bush 38. The liquid in these chambers will be pressurised by the flow of incoming liquid, and part of the liquid will be forced between the spindle and the bushes 32, 33 in the links 22, 23, thereby cleaning the bearing surfaces on these components. The remainder of the liquid from the chambers formed by recesses 39 will flow radially outwards between the ends of the bush 38 and the adjacent links 22, 23.

The cleaning liquid preferably has a bacteriocidal and/or a bacteriostatic and/or a detergent action, and can conveniently be any of the washing detergent liquids in use in the dairy industry.

The external surfaces of the chains and slats can be cleaned by clean-in-place equipment.

In accordance with the invention and as shown in FIG. 5, one end of the slat 14 is attached to a link 20 fitted with two transverse spindles 24 engaged in bearing apertures formed by the bushes in links 22, 23, 21 which are arranged outboard of the link 20 attached to the slat, and the other end of each slat 14 is attached to a link 22 provided with two bearing apertures formed by the bushes therein, the link 20 of the associated chain being arranged inboard of the link 22 and having two spindle 24 engaged in the bearing apertures in the link 22 attached to the other end of the slat. Each slat assembly consisting of the slat 14 fitted with a link 20 at one end and a link 22 at the other end can thus readily be removed from the remainder of the conveyor for cleaning purposes by removing the hitch pins from the spindles identified by the references 24a, 24b, 24c, 24d, 24e, 24f in FIG. 5, and sliding the links 21a, 21b, 23a, and the rollers 25a, 25b off the spindles 24a, 24b, 24c, 24d. The slat assembly may then be moved axially in the direction of the arrow A in FIG. 5 to withdraw the spindles 24e, 24f from the bearing apertures formed by the bushes in the links and rollers pivotally mounted thereon, and to slide the link 22 on the slat off the spindles 24b, 24c. The slat assembly can be replaced by reversing the procedure.

The side chain shown in FIG. 8 has components which are similar in construction and operation to the components of the chain of FIGS. 4 and 5, and to facilitate the description of the chain of FIG. 8 its components are identified by the reference numerals of the corresponding components of the chain of FIGS. 4 and 5 with the addition of 100.

The chain of FIG. 8 comprises links 120, 121, 122, 123, spindles 124, and rollers 125 similar in construction and operation to the links 20, 21, 22, 23, spindles 24 and rollers 25 of the chain of FIGS. 4 and 5. The slat support brackets 155 in the chain of FIG. 8 are however formed integral with the links 120, and the slat support brackets 156 are formed integral with the links 122. As shown in FIGS. 6 and 7, each link 120 and bracket 155 are formed from a single flat metal plate, one end of which is shaped to form the link 120 and the other end of which is shaped to form the bracket 155. The centre portion of the flat metal plate is folded as shown in FIG. 7 so that the bracket 155 extends substantially perpendicular relative to the adjacent side of the link 120. Each link 122 and slat support bracket 156 are similarly formed by folding a metal plate of the shape shown in FIG. 6.

The two end portions of each of the links 120 and 121 are deformed out of the general plane of the link in the direction towards the adjacent link which is in overlapping relationship, as shown in FIG. 8. Thus the ends 160 of links 120 are each deformed in the direction towards the adjacent overlapping link 122 so as to make point or line contact with the link 122. The remainder of the overlapping portions of links, 120, 122 are thus spaced apart and this facilitates cleaning by clean-in-place equipment. Similarly the ends 161 of the link 121 are each deformed in the direction towards the adjacent overlapping link 123 so as to make point or line contact with link 123, the remainder of the overlapping portions of links 121 and 123 being spaced apart.

The roller 125 of the side chain of FIG. 8 is provided with a peripheral groove 125a to enable the side chain to be mounted on a guide rail (not shown) with the upper portion of the rail accommodated in the groove in the roller.

What I claim is:

1. A slat conveyor comprising a pair of endless chains mounted on guide means for improvement along parallel tracks, each chain comprising links pivotally connected to one another by transverse spindles, a plurality of transverse slats mounted on and extending between the chains, and securing means attaching the ends of the slats to separate links respectively of the associated chains, wherein the link attached by said securing means to one end of each slat is fitted with transverse spindles of the associated chain, the adjacent links of the associated chain being arranged outboard of the link attached to said one end of the slat and being formed with bearing apertures in which the spindles are engaged, and the link attached by said securing means to the other end of each slat is provided with bearing apertures, adjacent links of the associated chain being arranged inboard of the link attached to said other end of the slat and having tranasverse spindles engaged in said bearing apertures in the link attached to said other end of the slat, whereby each slat can be disengaged from the remainder of the chains by withdrawing the slat axially in a direction away from said one end thereof so as to slide the spindles on the link attached to said one end of the slat out of the bearing apertures in the adjacent links and slide the link attached to said other end of the slat off the spindles on the adjacent links.

2. A slat conveyor as claimed in claim 1, wherein the spindles on the link attached to each slat at said one end thereof are pivotally mounted in the bearing apertures in the links attached to said other ends of the adjacent slats.

3. A slat conveyor as claimed in claim 2, wherein each chain comprises pairs of parallel links arranged alongside one another, the inboard link of each alternate pair of links being attached by said securing means to one end of a slat and fitted with two transverse spindles, and the inboard link of each other alternate pair of links being attached by said securing means to a slat and provided with bearing apertures, the spindles on the inboard links being engaged in the bearing apertures in the other inboard links.

4. A slat conveyor as claimed in claim 2, wherein each chain comprises pairs of outer links pivotally connected to pairs of inner links by transverse spindles, the spindles being secured to the inboard outer links and each slat having one end attached by said securing means to an inboard outer link and the other end attached by said securing means to an inboard inner link.

5. A slat conveyor as claimed in claim 4, wherein a roller is rotatably mounted on each spindle between the inner links, the rollers being adapted to roll along guide rails below the chains.

6. A slat conveyor as claimed in claim 1, wherein the links having the bearing apertures are located on the spindles by detachable pins on the outboard ends of the spindles.

7. A slat conveyor as claimed in claim 6, wherein the outboard ends of the spindles are each formed with a transverse bore and with a groove in the outside surface of the spindle, and the pins each comprise two limbs, one limb being engaged in said transverse bore in the spindle and the other limb being engaged in said groove in the surface of the spindle.

8. A slat conveyor as claimed in claim 7, wherein said one limb is straight, and the other limb has a curved portion engaged as a snap fit in the groove.

9. A slat conveyor as claimed in claim 1 in which two successive links have the adjacent end portions thereof arranged alongside one another in overlapping relationship, wherein an end of at least one of the links is deformed out of the general plane of the link in the direction towards the other link, whereby the deformed end of the link makes contact with the other link and the remainder of the overlapping portions of the two links are spaced apart from one another.

10. A slat conveyor comprising a pair of endless chains mounted on guide means for movement along parallel tracks, and a plurality of transverse slats mounted on and extending between the chains, each chain comprising links pivotally connected to one another by transverse spindles, wherein one end of each slat is attached by a bracket to a link fitted with transverse spindles of the associated chain, the adjacent links of the associated chain being arranged outboard of the link on said one end of the slat and being formed with bearing apertures in which the spindles are engaged, and the other end of each slat is attached by a bracket to a link provided with bearing apertures, adjacent links of the associated chain being arranged inboard of the link attached to said other end of the slat and having transverse spindles engaged in said bearing apertures in the link attached to said other end of the slat, whereby the slat can be disengaged from the remainder of the chains by withdrawing the slat axially in a direction away from said one end thereof so as to slide the spindles on the link on said one end of the slat out of the bearing apertures in the adjacent links and slide the link on said other end of the slat off the spindles on the adjacent links, and wherein each of said brackets and its associated link are integral and formed from a metal plate, one end of said plate being shaped to form the link, the other end of said plate being shaped to form the bracket, and the center portion of said plate being folded so that the bracket extends substantially perpendicularly relative to the adjacent side of the link.

* * * * *